United States Patent

Paabo et al.

[15] 3,639,171
[45] Feb. 1, 1972

[54] METHOD OF ISOLATING D-XYLOSE FROM HARDWOOD SULPHITE LIQUOR

[72] Inventors: George J. Paabo; Ants-Michael Uesson, both of Malmo, Sweden

[73] Assignee: Sydkemi Aktiebolag, Malmo, Sweden

[22] Filed: May 2, 1969

[21] Appl. No.: 821,480

[30] Foreign Application Priority Data

Dec. 5, 1968 Sweden..................................16624/68

[52] U.S. Cl. .................................127/37, 127/30, 127/46 R, 162/16, 260/124 A
[51] Int. Cl. ......................C13k 9/00, C13k 1/02, D21c 3/20
[58] Field of Search ..........................127/37, 46, 30; 162/16; 260/124, 3

[56] References Cited

UNITED STATES PATENTS

| 2,442,804 | 6/1948 | Gaylor | 127/46 |
| 2,944,922 | 7/1960 | Boggs et al. | 127/37 |
| 3,337,366 | 8/1967 | De Haas et al. | 127/46 |

OTHER PUBLICATIONS

Enkvist et al., "Fractionation of Concentrated Ca-Base Spent Sulfite Liquor with Ethanol," Chem. Abs. 53:21754b(1960)

*Primary Examiner*—Morris O. Wolk
*Assistant Examiner*—D. G. Conlin
*Attorney*—Beveridge & De Grandi

[57] ABSTRACT d-Xylose is isolated from hardwood sulphite liquor by means of azeotropic isopropyl alcohol.

2 Claims, No Drawings

METHOD OF ISOLATING D-XYLOSE FROM HARDWOOD SULPHITE LIQUOR

This invention is concerned with the recovery of d-Xylose from hardwood sulphite liquor. It is well known that hardwood sulphite liquor contains considerable amounts of d-Xylose, varying with the species of wood used in the cooking process.

However, there is no simple and economical method for the recovery of d-Xylose from the sulphite liquor, although there are known several ways for the separation of a crude sugar fraction from the lignosulphonates. In general, a mixture of solvents is preferred for this purpose, which creates problems in the recovery of solvents.

Xylose can also be extracted from spray-dried Calcium lignosulphonate powder using a mixture of absolute and 95 percent ethyl alcohol. In this process, the drawback is the recovery of the anhydrous ethanol, which requires approximately twice the amount of steam as compared to the recovery of 95 percent alcohol, increasing the cost of the recirculating alcohol mixture.

In the present invention an azeotropic mixture of isopropyl alcohol and water (containing 87.7 percent of isopropyl alcohol by weight) is used to effect the separation of sugars from lignosulphonates in a specific manner so that d-Xylose can readily be crystallized from the purified sugar fraction. As only the azeotropic mixture of isopropyl alcohol—water is used in the extraction and purification process, there is no need for the recovery of concentrated isopropyl alcohol.

The sulphite liquor has to be concentrated to a solids content of 40–55 percent. The concentration is done under vacuum, so that the temperature of the sulphite liquor does not exceed 60° C. Above that temperature a darkening of the solution takes place, with the effect that the sugar solution is also darker, the yield of d-Xylose from the first crystallization is reduced, and furthermore, no second crops are obtained. The same care has to be taken during the concentration of the sugar solution, while recovering the azeotropic isopropyl alcohol, which is done under partial vacuum at a temperature under 60° C.

The bulk of Calcium lignosulphonates is separated from the sugar-containing solution by adding azeotropic isopropyl alcohol in a quantity depending on the water content of the concentrated sulphite liquor. One kilogram of concentrated sulphite liquor, containing 40 percent solids, requires the addition of 3 liters of azeotropic isopropyl alcohol; with a solids content of 50 percent, the required amount is 2.5 liters and with 55 percent solids 2.25 liters. During the mixing of azeotropic isopropyl alcohol with sulphite liquor the mixture is heated up to 60° C. and stirred at this temperature for 5 minutes. After settling, the top layer, containing the sugars, some calcium lignosulphonates, isopropyl alcohol and water is separated and the bottom layer stirred up once more at 60° C. with 500 ml. of azeotropic isopropyl alcohol per 1 kilogram of sulphite liquor concentrate. The top layer is separated again and combined with the main extract. The combined extracts are left to settle while cooling to room temperature.

The brownish-yellow clear solution is decanted from a small amount of dark residue and concentrated to syrup at a temperature below 60° C. To the syrup, azeotropic isopropyl alcohol is added again, using 4 parts by volume to 1 part of the residue (by weight). The mixture is heated again to 60° C. with stirring. After settling, the top layer is removed and the residue heated again with 2 parts of azeotropic isopropyl alcohol. The combined solutions are cooled to +5° C. and filtered. The clear yellow solution is concentrated to a syrup again and d-Xylose is crystallized from it by dissolving the syrup in 1.6 to 2 parts of 95 percent ethanol by heating and cooling down to +5° C. for 24 hours. A second crop is obtained by removing half of the ethanol and crystallizing for 48 hours. The noncrystallizing residue of sugars can be used as molasses.

The isopropyl alcohol entrained in the Calcium lignosulphonate residues is recovered by combining the residues from 1st and 2nd separation, adding to the residues one-half of its weight of hot water and distilling off the azeotropic isopropyl alcohol.

As will be shown, the azeotropic isopropyl alcohol can also be used advantageously for the recovery of d-Xylose from sugar fractions obtained from concentrated or spray-dried sulphite liquor by other methods.

EXAMPLE 1

Three kilograms of birch sulphite liquor, containing 11 percent solids was concentrated in vacuum, below 60° C., to 660 grams. To this concentrate, 1,650 ml. of azeotropic isopropyl alcohol was added and the mixture heated with good stirring to 60° C. and kept at this temperature for 5 minutes. The lignosulphonate fraction settled quickly and, as it was not too viscous, was run off. The lignosulphonate fraction was treated once more with 330 ml. of azeotropic isopropyl alcohol at 60° C. The combined extracts were left to settle for 18 hours. The clear, brownish-yellow solution was decanted off and concentrated to a syrup. To the syrup, weighing 144 grams, was added 576 ml. of azeotropic isopropyl alcohol and the mixture was heated with stirring to 60° C. The mixture was cooled down to room temperature and the solution decanted. The residue was heated again with 288 ml. of azeotropic isopropyl alcohol. After decantation, the solutions were combined and cooled down to +5° C. The supernatant solution was filtered and concentrated to a syrup, which weighed 102 grams. This was dissolved in 162 ml. of 95 percent Ethanol by refluxing for 10 minutes. The resulting solution was cooled to 20° C. and seeded with a small amount of d-Xylose. After cooling the solution to +5° C. for 24 hours with occasional stirring, the d-Xylose was filtered and washed with 300 ml. of precooled 95 percent ethanol. The yield of d-Xylose was 38.6 grams. The mother liquor was concentrated to a quite viscous solution at 55°–60° C. The recovered 95 percent ethanol amounted to 380 ml. The residue was seeded and left to crystallize for 48 hours at +5° C. The second crop was filtered, washed with precooled ethanol and amounted to 5.4 grams.

The isopropyl alcohol entrained in the calcium lignosulphonate residues was recovered by adding to the combined residues one-half part of water and distilling off the alcohol.

EXAMPLE 2

One kilogram of birch sulphite liquor was concentrated in vacuum under 60° C. to a weight of 220 grams. Fifty-five grams of water was added to the solution to obtain a solids content of 40 percent. The concentrated sulphite liquor was treated first with 660 ml. of azeotropic isopropyl alcohol, recovered from the previous experiment by fractionation, and secondly, with 110 ml. of 87.7 percent isopropanol. After settling for 20 hours, the solution was concentrated and the resulting syrup (50 grams) treated again with 300 ml. azeotropic isopropyl alcohol at 60°C. The solution was cooled to +5° C. for 18 hours. After filtration, the solution was concentrated to a syrup (36 grams) and the syrup dissolved in 72 ml. of 95 percent ethanol. After 24 hours crystallization at +5° C., 9.5 grams of Xylose was obtained. A second crop of 2.9 grams was obtained after concentration of the mother liquor and crystallization for 48 hours.

EXAMPLE 3

Two hundred grams of commercial birch sulphite liquor concentrate, containing 55 percent of solids, was stirred at 60° C with 450 ml. of azeotrophic isopropyl alcohol for 5 minutes. The calcium lignosulphonate layer which settled out was too viscous and the supernatant liquid had to be decanted. The bottom layer was treated again with 110 ml. of 87.7 percent isopropyl alcohol. The syrup, after the first concentration, amounted to 40 grams. After the second treatment with 87.7 percent isopropyl alcohol, 32 grams of syrup was obtained. This material was considerably darker than the syrup from previous experiments. After dissolving it in 62 ml. of 95 percent ethanol and crystallizing for 24 hours, 7.9 grams of d-Xylose was obtained. After concentrating the mother liquor and crystallizing for 48 hours, no second crops were obtained. Even after standing a week in the cold, only an insignificant amount had crystallized. As the material came from the same source as the 11 percent birch sulphite liquor, it can be assumed that the poorer result is caused by a high temperature during the concentration.

EXAMPLE 4

Forty-two grams of sugar concentrated, obtained from 100 grams of spray-dried sulphite liquor by extraction with 9 parts of boiling methanol and which had failed to crystallize from 95 percent Ethanol, was treated with 252 ml. of azeotropic isopropyl alcohol at 60° C. After settling for 24 hours at +5° C. and concentrating the supernatant solution to a syrup, 32 grams were obtained. The color of the syrup had changed from dark brown to brownish-yellow. After dissolving it in 55 ml. of 95 percent Ethanol and seeding, 10.5 grams of Xylose crystallized in 24 hours at +5° C. After concentration, 1.9 grams of Xylose crystallized in 48 hours.

We claim:

1. A method of isolating d-xylose from crude sugar concentrate obtained from hardwood sulphite liquor, comprising the steps of extracting the crude sugar concentrate with azeotropic isopropyl alcohol to obtain an extract, concentrating said extract recovering said azeotropic isopropyl alcohol whereby said azeotropic isopropyl alcohol may be used again, dissolving said concentrated extract in 95 percent ethanol to obtain a solution, and crystallizing d-xylose from said solution.

2. A method of isolating d-xylose from hardwood sulphite liquor, comprising the steps of concentrating hardwood sulphite liquor to a dry content of 40–55 percent at reduced pressure and a temperature of at most 60° C. extracting said concentrated liquor at a maximum temperature of 60° C. with azeotropic isopropyl alcohol in an amount of 5 parts by volume of azeotropic isopropyl alcohol per 1 part by weight of water in said concentrated liquor to obtain a first crude sugar extract, concentrating said first extracting recovering said azeotropic isopropyl alcohol for subsequent reuse, and extracting said concentrated first extract with azeotropic isopropyl alcohol in an amount of 6 liters per 1 kg. of said concentrated first extract to obtain a second sugar extract, cooling said second extract to +5° C., concentrating said second extract recovering said azeotropic isopropyl alcohol for subsequent reuse and dissolving said concentrated second extract in 95 percent ethanol to obtain a solution and crystallizing d-xylose from said solution.

* * * * *